Feb. 23, 1932.  W. C. MILLER  1,846,891
CHRISTMAS TREE HOLDER
Filed Jan. 13, 1930

INVENTOR
W. C. Miller
BY Siggers + Adams
ATTORNEYS

Patented Feb. 23, 1932

1,846,891

UNITED STATES PATENT OFFICE

WILLIAM C. MILLER, OF HAZLETON, PENNSYLVANIA

CHRISTMAS TREE HOLDER

Application filed January 13, 1930. Serial No. 420,450.

This invention relates to Christmas tree stands or holders and, among other objects, aims to provide an improved simple holder adapted to contain water to preserve the life-like appearance of the tree. Another aim is to provide a holder of this character which can be made very cheaply of sheet metal and which has a very attractive appearance.

Other aims and advantages of the invention will appear in the specification, when considered in connection with the accompanying drawings, wherein.

Referring particularly to the drawings, the holder there shown is in the form of a frusto-conical, sheet metal receptacle having an enlarged disk-shaped base 10 and a frusto-conical wall 11 conveniently presenting a horizontal marginal flange 12 at its lower end about which the marginal edge of the base 10 is crimped and soldered or brazed in much the same manner as the bottom of an ordinary sheet metal receptacle.

Figure 1:
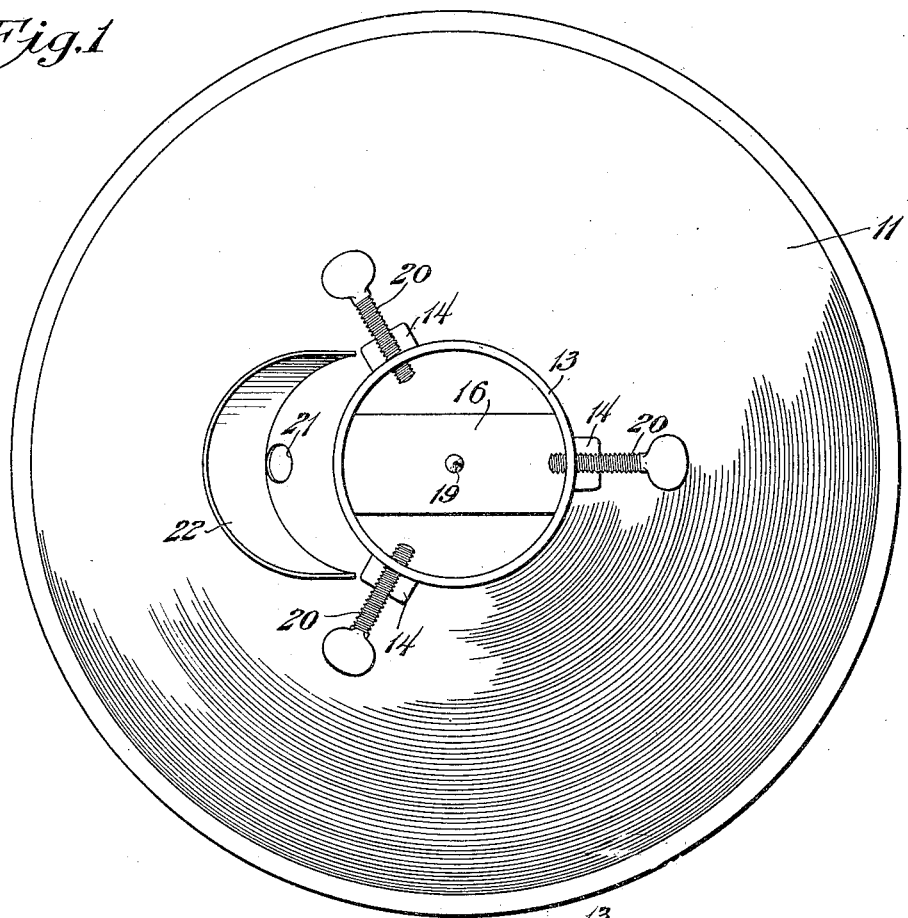
Fig. 1 is a top plan view of a holder embodying the invention.
Figure 2:
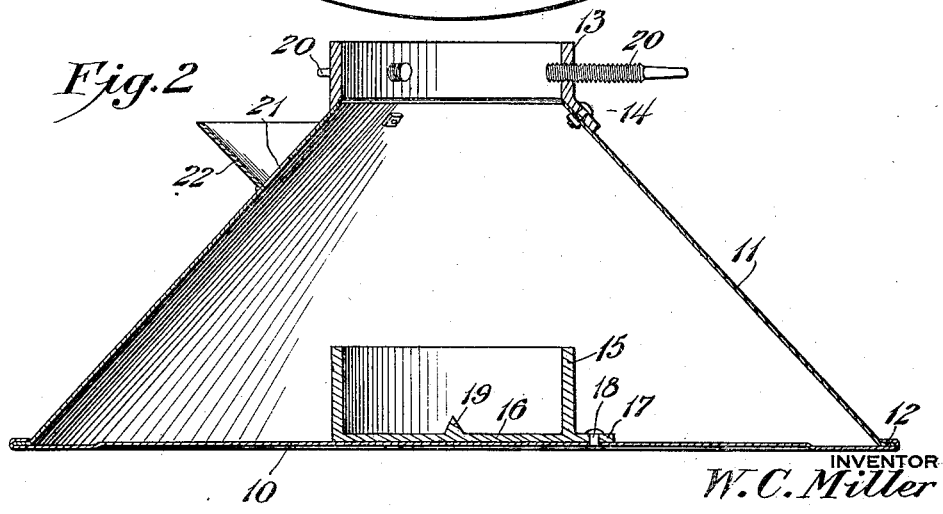
Fig. 2 is a vertical sectional view through the holder shown in Fig. 1.

A cylindrical collar 13 is here shown as being secured in the open end of the receptacle. In this example, the internal diameter of the collar is sufficiently large to accommodate the trunk of any ordinary Christmas tree and it has integral ears 14 engaging the outer wall of the receptacle and conveniently secured thereto by means of bolts or rivets, the lower edge of the collar being beveled to fit over the mouth of the receptacle, as clearly shown in Fig. 2. The collar is preferably made of cast metal so that no machining is required.

To guide the lower end of a tree and hold it approximately vertically in the receptacle, there is shown a cast metal collar or flange member 15 having a cross piece or a bar 16 extending across the bottom and presenting radial ears 17 secured to the bottom wall 10 of the receptacle. This collar is preferably of the same diameter as and arranged in vertical alinement with the collar 13. In this example, the bottom wall 10 is upwardly depressed to make room for the heads of bolts or rivets 18 which pass through the ears 17; although it will be understood that they may be spot welded or soldered to the bottom. At the center of the bar 16, there is shown an integral projection providing a centering pin 19 conveniently made of hardened steel and driven through a punched out opening in the bar. When a tree having its lower end sawed off substantially square is inserted in the receptacle, the centering pin will stick into the base of the tree and prevent it from being shifted about. The collar or ring member 15 serves as a guide for the base of the tree as it is being inserted.

To grip the tree and hold it firmly in the receptacle, as well as to adjust it laterally to make it stand vertically, there is shown a series of radial thumb screws 20 projecting through the collar or ring 13. Thus, the tree may be firmly gripped in the proper position and will not shift about or tip to one side or the other.

It is desirable to have provision for filling the receptacle to the proper level after the tree has been set in place in order to avoid the possibility of overflowing the receptacle, and spilling water on the floor or a rug. To this end, there is shown a filling opening 21 in the frusto-conical wall below the collar 13. A crescent-shaped flange 22, conveniently made of sheet metal, is secured to the wall adjacent to the filling opening to provide a filling spout or mouth so that the water may be poured into the receptacle from an ordinary vessel without spilling it on the floor. This construction and arrangement not only enables the receptacle to be filled after a tree is set in place, but also, makes it convenient to replenish the supply of water from time to time as it is absorbed by the tree or evaporates.

From the foregoing description, it will be understood that the receptacle can be made very cheaply and that its shape is such as to provide a very stable support for a tree. It may be painted any suitable color or colors so that it will have a very attractive and ornamental appearance.

Obviously, the present invention is not restricted to the particular embodiment thereof herein shown and described.

What is claimed is:

A Christmas tree holder comprising, in combination, a water receptacle having an enlarged base and a relatively small open upper end; a metal collar secured to the open end of the receptacle and having a series of thumb screws threaded therethrough adapted to engage a tree inserted therein; a substantially cylindrical guiding flange secured in the bottom of the receptacle in alinement with said collar; a cross bar diametrically arranged within said cylindrical ring; a centering pin projecting upwardly from said cross bar adapted to engage and hold the base of a tree properly centered within the receptacle; a filling opening at one side of the receptacle adjacent to the upper end thereof; and a flange secured to the side wall of the receptacle adjacent to said filling opening to provide a pouring funnel for the receptacle.

In testimony, that I claim the foregoing as my own, I have hereto affixed my signature.

WILLIAM C. MILLER.